United States Patent [19]

Easton

[11] Patent Number: 4,472,928
[45] Date of Patent: Sep. 25, 1984

[54] COMBINE REEL ANTI-WRAPPING PROTECTOR

[76] Inventor: Harlan J. Easton, R.R. 3, Blooming Prairie, Minn. 55917

[21] Appl. No.: 432,020

[22] Filed: Sep. 30, 1982

[51] Int. Cl.$^3$ .......................................... A01D 57/02
[52] U.S. Cl. .................................................... 56/220
[58] Field of Search .................. 56/220, 219, 221–226, 56/400

[56] References Cited

U.S. PATENT DOCUMENTS

| | | | |
|---|---|---|---|
| 1,196,237 | 8/1916 | Holm | 56/220 |
| 2,748,556 | 6/1956 | Summers et al. | 56/220 |
| 3,158,976 | 12/1964 | Scheidenhelm | 56/220 |
| 4,038,810 | 8/1977 | Williams et al. | 56/220 |

*Primary Examiner*—Jay N. Eskovitz
*Attorney, Agent, or Firm*—Kinney & Lange

[57] ABSTRACT

An anti-wrapping protector for spring fingers on a reel for combines and other harvesting equipment and in particular for use on the type of combine reel generally known as the "Hume" reel. The Hume reel includes mechanisms to keep provided spring teeth or tines on the reel always pointed substantially vertically downward from their support pipe. In combining (harvesting) soy beans and other crops that tend to cling and wrap around anything that moves, as well as cutting hay with windrowers, it has been found that coils in the springs in the well known "Hume" reel as well as the pipes and tine support bats themselves cause wrapping. This requires stopping to clean the material out and great time delays are encountered. The present device is a unitary, molded plastic tubular member that has a slit so the tube can be slipped over the support pipe, bat, and coil of the reel spring tooth and then secured in position to protect the parts from wrapping. The tubular member is rectangular in shape, as shown, and one side of the rectangle extends downwardly to form a leg of desired length to protect the shield and the tine part of the reel springs as well.

4 Claims, 4 Drawing Figures

COMBINE REEL ANTI-WRAPPING PROTECTOR

BACKGROUND OF THE INVENTION

1. Field of the Invention

The present invention relates to an attachment for use on harvester reels in particular to prevent crop materials from wrapping and catching on the spring tines and tine supports of the reel.

2. Prior Art

In the prior art the problem of wrapping on spring teeth reels used on combines and other harvesting equipment has been around for years. The standard "Hume" reels have been used for years and have worked successfully. The Hume reel has cross support pipe members that carry spring tines and includes a mechanism so that the support pipes on the reel pivot on their support arms and the tines remain oriented in space; that is they will remain substantially perpendicular to the ground as the reel rotates. This type of reel is well known (as shown on page 55 of *Fundamentals of Machine Operation*—Hay and Forage Harvesting, Deere and Company, Moline, Ill., 1976. The reel is shown only schematically herein.

Some farmers have attempted to solve the wrapping problems with these reels by slitting plastic drainpipe in half longitudinally, and then fastening the two sections around the coil springs of the reel. These shields are helpful, but they are very difficult to use and of course the slitting of the pipe even takes a good bit of time. Additionally, "two section" tubular protectors have been advanced where one section has holes for receiving the tines. The lower section of the protector slips over the tines and the other section is above the tines. The two sections are again fastened together. This type of protector is very difficult to make and the parts did not hold together well.

SUMMARY OF THE INVENTION

The present invention relates to a unitary, tubular plastic anti-wrapping shield for a harvester reel. The tubular shield has a longitudinal slit along one side so that the walls can be spread apart, and opened up sufficiently to be slipped over the support pipe of a reel bat that supports the tines, and the tine spring coils themselves. This is done very quickly on the individual sections of the reel in between the support "spiders". The tube springs to close the slit and the edges of the slit close down on the tines with the tines sticking through the slit in a useable position. The protector is then fastened in place in a suitable manner.

In the form shown, the tube is generally rectilinear with a slight taper in size, if desired, and one side wall of the tube extends past the cross wall to form a flange. The mating cross wall along the slit also has a flange and preferably the flanges are then held together with a "pop" rivet or with a suitable fastener. If desired, the protector tube can merely be taped shut to hold it in place on the reel.

The protector is easily used, easily made, and low cost. The length of the protector can be custom cut by the user quite easily to meet his individual needs.

The shield keeps crops from engaging the spring coils of a tine, as well as the mounting bat and pipe of the reel to prevent these portions from catching crop or forage material and causing wrapping as the reel is operated.

DETAILED DESCRIPTION OF THE PREFERRED EMBODIMENTS

Figure 1:
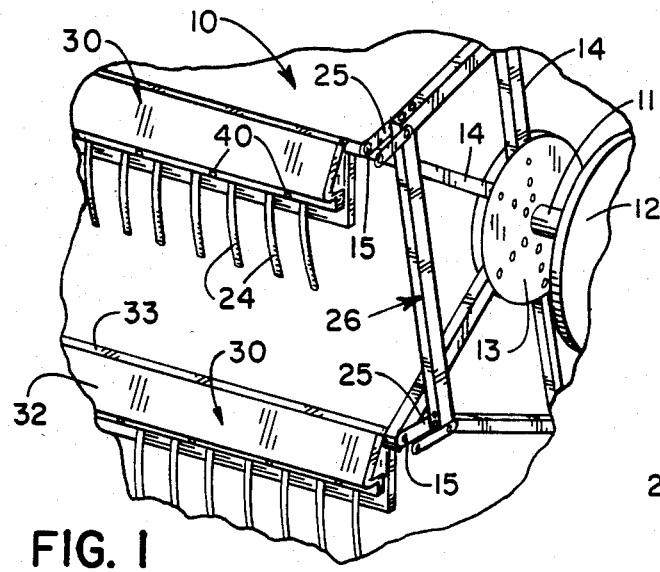
FIG. 1 is a fragmentary perspective schematic view of a harvester reel that is of standard design, and includes the anti-wrap protectors made according to the present invention.
Figure 2:
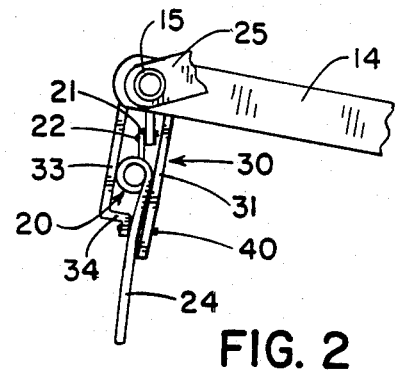
FIG. 2 is an enlarged fragmentary side view showing a reel support arm, pivoting reel support pipe, bat and reel spring tine.

In FIG. 1, a combine reel indicated generally at 10 is shown only schematically because it is of the conventional design. The reel represented is commonly known as the "Hume" reel presently used on many combines, particularly where they work in connection with soy beans, and other types of row crop or vine type plants. The reel 10 is made so that it has pivotally mounted support pipes carrying spring loaded tines, and a lever arm and control arrangement that maintains these pipes in orientation so that the tines extend vertically downwardly from the pipes at substantially all times during the rotation of the reel. The purpose of the reel is to guide crops into the combine or other harvester as the harvesting takes place.

The reel has a center support shaft 11, driven from a pulley shown fragmentarily at 12, and supported in a normal manner for rotation. The shaft 11 has a plurality of reel spiders 13 thereon. The spider 13 comprise a pair of plates mounted on the shaft 11 holding a plurality of radially extending reel bat support arms 14 at spaced radial locations around the perimeter of the spider. Each of these arms 14 pivotally mounts a cross pipe 15 that forms a support for a reel bat 16. The reel bat is a piece of imperforate material that is fixed to and extends from the pipe 15 and provides a place for mounting a plurality of reel tines 20. The tines 20 have a loop 21 for fastening to the bat 16 with a suitable fastener 22. The tines have a spring coil 23 to provide a spring action to the tine shank or tooth 24 which is positioned below the edge of the bat as shown and which extends downwardly a desired distance. The pipe 15 has a control arm 25 mounted thereto, and this control arm is operated by a control mechanism 26 which forms no part of the invention and extends to control the reel bats of all of the support arms 14. This control mechanism 26 is what controls the rotational position of the pipe 15 and thus the tine shanks or teeth relative to the ground and in the conventional manner the tines always point toward the ground.

This construction is shown only schematically and forms no part of the invention because it is conventional.

The anti-wrap device of the present invention will operate satisfactorily on any type of reel that uses the spring tines on the reel bats whether or not the tines are always oriented vertically downwardly. The anti-wrap device of the present invention shown at 30 comprises an extruded, rectilinear section tube having a first side wall 31, a second spaced parallel side wall 32, and top or cross wall 33 and a bottom or cross wall 34. The lower edge of the tube is slit longitudinally as at 36 so that there is a longitudinally extending opening in the tube. The wall 31 extends downwardly below the bottom wall 34, as shown, and the wall 34 has a flange 37 that turns down and extends parallel to the wall 31. This extension is used for providing a pair of flanges that define the slit or opening 36 to provide for locating fasteners, such as pop rivets 40 through the flange 37 and a portion of the wall 31 to hold the tube in position. The fasteners can be located at spaced locations along the tube as desired.

The tube can be made of ABS plastic for example, which is springy, tough, and quite low cost.

Figure 3:
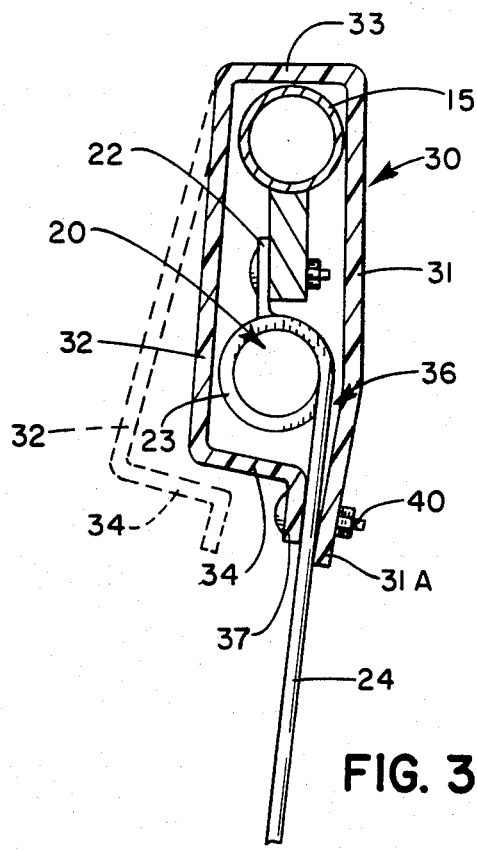
FIG. 3 is an enlarged sectional view taken generally along line 3—3 in FIG. 1 showing the anti-wrap device of the present invention in place.

To place the anti-wrap device onto a reel pipe, the flange 37 is separated from the wall 31 as shown in dotted lines in FIG. 3, and then merely slipped down over the reel pipe 15 between a pair of support arms 14 (there are several sets of support arms and spiders along the length of the shaft 11). The tube is permitted to snap toward closed position. The tine teeth or shanks 24 will extend down through the slit 36 between the flange 37 and the wall 31 as shown. The tine shank protrudes outwardly in useable position generally as shown in FIG. 1. The fasteners 40 then are placed between the tines in desired locations.

It should be noted that the tines may be made with two of the tine teeth 24 and two coils formed into one set with one fastener loop 21 between them or they may be made individually.

The wall 31 has the lower flange portion 31A that extends down from the wall 34 to provide some protection for the tine teeth as well as helping to ensure that crop material is deflected to help prevent it from getting caught in the tines as easily.

The protector tube is quite easy to remove because pop rivets can easily be cut, or if the pop rivets 40 were replaced with screws it could be taken off by removing the screws. Additionally, wrapping or duct tape has been used just to be wrapped around the protector tube 30 at spaced locations to hold it in position.

The plastic material of the tube is slippery so that the crop material does not tend to cling to it, and there is no protrusion to pick up or engage crop material and cause wrapping.

Figure 4:
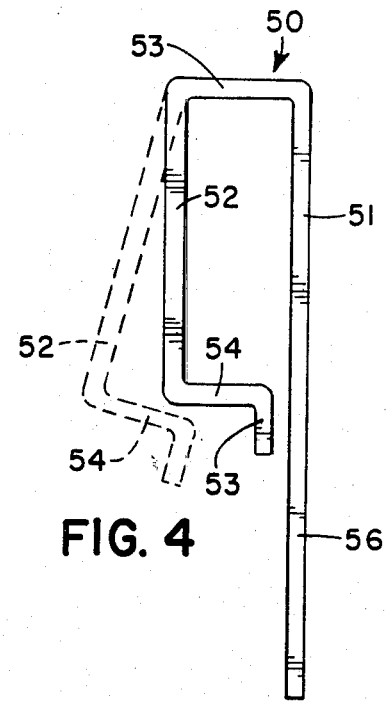
FIG. 4 is an end view of a modified form of the anti-wrap protector of the present invention.

In FIG. 4, a modified form of the anti-wrap protector tube is shown. This is shown as an end view and as can be seen it is an anti-wrap tube 50 that has a first side wall 51, a second parallel side wall 52, and a top wall 53 and a bottom wall 54. The bottom wall 54 has a flange 55 thereon which turns down and is parallel to the wall 51. However in this case, the wall 51 has a long extending flange 56 that extends a substantial distance past the end of flange 53, and this wall then will extend down along the tine teeth 24 of a spring tine for a reel in the same manner as the flange 31A, but for a greater distance.

In a very short crop, such as Milo, a cereal grain that is grown in Minnesota and other areas, the modified form of the anti-wrap device will find use. The flange 56 extends down so that substantially one-half the length of the protruding tine teeth are covered, to keep the material from tending to snag on the tine teeth during use.

The modified form is an extruded plastic ABS plastic tube as well, with the longitudinal slit defined by flanges or flange means (36 and 31A) that can then be fastened together with suitable fasteners, such as the fastener 40, with the tine teeth 24 protruding through the slit and outwardly for use.

The rectilinear shape has been found to be very satisfactory because the mounting tube, reel bat and coil for the spring tines form an elongated relationship vertically. The rectilinear form of the tube slips over all components and completely shields these parts of the reel.

The tubes as stated are easily cut to length by the user and fastened in place. The tubes can easily be removed for repairs to the reel bat used for supporting the tines or for replacement of the spring tines if some should break. Harvesting as used herein includes forage or hay harvesting equipment.

What is claimed is:

1. An anti-wrapping protector for use with harvester reels, wherein the reel is rotatable about an axis and has transverse support members supported outwardly from the axis, and each support member having a plurality of spring tines, each tine including a spring coil near one end adjacent to the transverse support and an elongated tooth extending from the spring coil, each spring tine being supported on the transverse support, said protector comprising an elongated one-piece tube having wall means for forming a generally rectilinear cross sectional enclosure, said tube having a longitudinal slit along its entire length, said slit being defined by parallel edges that separate to open to space the portions of the tube defining the slit and to permit the tube to be slipped over one of the transverse supports and the spring coils of tines mounted on such transverse support of a reel on which the protector is to be used, the edges remaining separated to permit teeth of the tines on such transverse support to extend between the edges, and means for retaining said protector in position on the transverse support with which it is used.

2. The anti-wrapping protector or claim 1 wherein said tube is made of an extruded plastic material and is a unitary section.

3. The anti-wrapping protector of claim 1 wherein said generally rectilinear cross section tube has first and second elongated side walls, a top wall joining the first and second walls, a bottom wall generally parallel to the top wall and being attached to one of the elongated walls and separated from the other side wall to form a slit, said tube being of size so that it will fit over said transverse support and the spring coils of spring tines supported thereon, the teeth of such tines extending through the slit when the tube is in position on the transverse support.

4. For use in combination with a harvester reel including reel support members rotatable about an axis of a mounting shaft, and having axial reel bats elongated in direction parallel to the axis of rotation mounted thereon, said reel bats including support members for independently supporting spring tines, said spring tines having elongated teeth extending generally perpendicular to the longitudinal axis of the reel bats, the improvement comprising an auxiliary protector member to encompass the reel bat and substantial portions of the tine supported thereon to protect the reel bat from forage material wrapping thereon, without supporting the reel bat and the tines in position on the reel supports, comprising a plastic extruded tubular member having a generally rectilinear cross section and having first and second spaced apart side walls, and first and second spaced apart end walls, one edge of one of the end walls and the adjacent side wall being unconnected to form a longitudinally extending slit along the entire length of said extruded member, said one side wall extending beyond the one end wall in a direction opposite from the location of the other end wall to form a first flange coextensive with the one side wall and unconnected from the rest of the tube, and a second flange formed on said end wall at right angles to the end wall and generally parallel to the one side wall and extending in the same direction, but for a less length than the first flange to form two flanges of different length of extension, said extruded member being of size to be placed over a reel bat with the tines between the two flanges to provide a removable cover for the reel bat and the attachment of the tines to the reel bat, and means to secure the flanges relative to each other to retain the tubular member on the reel bat.

* * * * *

UNITED STATES PATENT AND TRADEMARK OFFICE
CERTIFICATE OF CORRECTION

PATENT NO. : 4,472,928

DATED : September 25, 1984

INVENTOR(S) : Harlan J. Easton

It is certified that error appears in the above-identified patent and that said Letters Patent is hereby corrected as shown below:

Delete Column 4, line 12 through 32, (Claim 1, line 1 through 21), and substitute the following:

--1. An anti-wrapping protector for use with harvester reels, wherein the reel is rotatable about an axis and has a plurality of radially extending support arms supported to extend radially outwardly from the axis, and the arms having transverse supports attached thereto with a plurality of spring tines mounted thereon, each tine including a spring coil near one end adjacent to the transverse support and an elongated tooth extending from the spring coil, each spring tine being supported on the transverse support, said protector comprising an elongated one-piece tube having wall means for forming a generally rectilinear cross sectional enclosure, said tube having a longitudinal slit along its entire length, said slit being defined by parallel edges that separate to open to space the portions of the tube defining the slit and to permit the tube to be slipped over one of the transverse supports and the spring coils of tines mounted on such transverse support of a reel on which the protector is to be used, the edges remaining separated to permit teeth of the tines on such transverse support to extend between the edges, and means for retaining said protector in position on the transverse support with which it is used.--

Signed and Sealed this

Twelfth Day of March 1985

[SEAL]

Attest:

DONALD J. QUIGG

Attesting Officer   Acting Commissioner of Patents and Trademarks